United States Patent [19]

Cross et al.

[11] Patent Number: 5,110,685
[45] Date of Patent: May 5, 1992

[54] LOW FRICTION, ABRASION RESISTANT POLYMER COATING

[75] Inventors: Virginia R. Cross, Houston, Tex.; Cindy B. Shulman, Cliff Side Park, N.J.

[73] Assignee: Exxon Chemical Patents, Inc., Linden, N.J.

[21] Appl. No.: 526,216

[22] Filed: May 18, 1990

[51] Int. Cl.$^5$ ............................................. B32B 25/08
[52] U.S. Cl. ................................. 428/494; 428/500; 428/521; 525/240
[58] Field of Search ................. 428/521, 500, 494; 525/240

[56] References Cited

U.S. PATENT DOCUMENTS

| Re. 31,518 | 2/1984 | Fischer | 525/240 |
| Re. 32,028 | 11/1985 | Fischer | 525/240 |
| 4,250,273 | 2/1981 | Bohm et al. | 525/99 |
| 4,423,117 | 12/1983 | Machonis et al. | 428/475.8 |
| 4,503,192 | 3/1985 | McShane et al. | 525/240 |
| 4,536,550 | 8/1985 | Moriguchi | 525/240 |
| 4,547,551 | 10/1985 | Bailey et al. | 525/240 |
| 4,588,775 | 5/1986 | McCullough | 525/240 |
| 4,849,973 | 7/1989 | Cigna et al. | 525/240 |
| 4,923,759 | 5/1990 | Brooks et al. | 428/521 |
| 4,957,679 | 9/1990 | Moore | 525/240 |

FOREIGN PATENT DOCUMENTS

| 325830 | of 0000 | European Pat. Off. |
| 3405973 | of 0000 | Fed. Rep. of Germany |
| 2580285 | of 0000 | France |
| 042624 | of 0000 | Japan |
| 104842 | of 0000 | Japan |

*Primary Examiner*—Edith L. Buffalow
*Attorney, Agent, or Firm*—J. E. Schneider; M. E. Wilson

[57] ABSTRACT

The invention relates to certain low friction abrasion resistant polymer coatings. The polymer coatings consist of thermoplastic materials based on blends of elastomers with high density polyethylene comprising a high molecular weight component. The appropriate balance of crystallinity, durability and flexibility can be achieved by selecting the proper amount of low, medium and high molecular weight high density polyethylene. The coating is particularly useful for weatherstripping material for automobile window channels.

33 Claims, No Drawings

LOW FRICTION, ABRASION RESISTANT POLYMER COATING

FIELD OF THE INVENTION

This invention relates to certain low friction abrasion resistant polymer coatings. The polymer coatings consist of thermoplastic materials based on high density polyethylene (HDPE) blends exhibiting appropriate balance of crystallinity, durability and flexibility.

BACKGROUND OF THE INVENTION

As is well known to those skilled in the art, window channel weatherstripping materials have traditionally been made from ethylene-propylene-diene terpolymers (EPDM) or thermoplastic elastomers (TPE). A thermoplastic elastomer is defined as a mechanical blend of fully or partially cross-linked rubber and thermoplastic material. One of the problems with these materials, however, is that they present too much friction relative to glass and as a result stick to glass. This stickiness to glass interferes with movement of the glass with respect to the weatherstripping and also contributes to a breakdown and degradation of the weatherstripping material. That problem has traditionally been overcome by flocking the surfaces of the weatherstripping material which reduces the friction and thereby eliminates sticking.

The flocking process adds several steps to the manufacturing process including (1) abrading the weatherstripping surface; (2) applying adhesive; (3) applying flocking; and (4) baking.

Recently, a variety of approaches have been taken to obviate the need for flocking. For example, European Patent No. 0 325 830 A2 teaches a coextruded blend of EPDM and a wear resistant thermoplastic such as polypropylene; French Patent No. 2,580,285 teaches a coating of low friction or self-lubricating material such as high molecular weight polyethylene; Japanese Patent No. 58/042,624 teaches a lubricant layer comprising crosslinked elastomer binder and a lubricating powder; West German Patent No. 3,405,973 teaches sealing strips composed of a rubber or elastomer and plastic or woven textile strip which are coextruded; and Japanese Patent No. 61/104,842 teaches a rubbery elastomer comprising a rubbery elastomer substrate, a nylon resin film, and a primer layer set between them. The primer layer is composed of chlorinated polypropylene, acid anhydride, epoxy resin, and an amine curing agent.

A low friction, abrasion resistant polymer coating would present several advantages over flocking. A more intimate contact between the weatherstripping and the glass would be achieved. Furthermore, such a coating could be coextruded with the weatherstripping material. Additionally, a coating being all polymeric would be more environmentally safe because such a coating would obviate the need for solvent-based adhesives now used with flocking.

A need still exists for a low friction, abrasion resistant coating with good adhesion to the weatherstripping material and good elasticity to prevent breaking upon flexing. Additionally, the coating should exhibit ultraviolet stability and a broad service temperature range.

SUMMARY OF THE INVENTION

This invention relates to low friction, abrasion resistant coatings with good adhesion to the weatherstripping materials and good elasticity to prevent breaking upon flexing. Additionally, the coating should exhibit ultraviolet stability and a broad service temperature range.

The coatings comprise an abrasion resistant HDPE polymer, an elastomer; and optionally an ultraviolet light resistant component blended to produce an appropriate balance of crystallinity, durability and flexibility. Additionally, by selecting the proper ultraviolet light resistant component, the color of the resulting coat may controlled.

DESCRIPTION OF THE PREFERRED EMBODIMENTS

This invention relates to certain low friction, abrasion resistant coatings with good adhesion to weatherstripping materials, good elasticity to prevent breaking upon flexing, good ultraviolet stability and broad service temperature.

The coatings of the invention are thermoplastic HDPE blends having an appropriate balance of crystallinity, durability, flexibility. Additionally, by selecting the proper ultraviolet light resistant component, the color of the resulting coat may controlled.

These HDPE blends comprise polymers selected to contribute specific properties, as outlined above, to the coating.

Since abrasion resistance increases with increased density or increased molecular weight, high density polyethylenes (HDPE), with a minimum density of 0.945, are used in the coating of the invention. Preferably the density ranges between 0.950 and 0.970 with a density of about 0.952 most preferred.

High density polyethylene polymers useful in the preparation of the coatings of the invention range in molecular weight from about 1,000 to about 4,000,000, preferably from about 100,000 to about 800,000.

In a preferred embodiment of the invention, the abrasion resistance is achieved with a blend of high density polyethylenes. Blends useful in the practice of the invention include bimodal molecular weight distribution (MWD) high density polyethylenes. Such bimodal MWD HDPEs have a high molecular weight component and a low molecular weight component. The high molecular weight component ranges in molecular weight from about 100,000 to about 4,000,000, preferably from about 100,000 to about 800,000. The low molecular weight component ranges in molecular weight from about 1000 to about 50,000, preferably from about 10,000 to about 50,000. The high molecular weight component imparts both abrasion resistance as well as toughness. The low molecular weight component contributes to processability.

In a preferred embodiment of the invention the above described bimodal polymer is combined with a medium molecular weight HDPE having a molecular weight ranging from about 50,000 to about 100,000, preferably from about 80,000 to about 100,000. This medium MW HDPE is added to enhance melt flow rates during processing.

The amount of high molecular weight component in the blend of HDPE can range from 10 to 80 per cent by weight, preferably 10 to 60 per cent most preferably about 15 to 25 per cent. The amount of medium molecular weight component, if present, in the blend of HDPE ranges from about 0 to about 80 per cent, more preferably about 20 to 70 per cent and most preferably about 55 to about 65 per cent. The balance of the HDPE blend is made up of low molecular weight component.

To impart coating flexibility and elasticity the above recited abrasion resistant polymers are blended with elastomers. Elastomers useful in the practice of the invention are ethylene/propylene rubbers (EPR) (such as Vistalon 503 brand EPR) and blends of ethylene/propylene rubber with HDPE. Blends useful in the practice of the invention are blends of EPR and HDPE, wherein the amount of EPR ranges from about 99 to about 50 per cent EPR.

The ratio of HDPE or HDPE blends to elastomer ranges from about 3:1 to about 19:1, preferably about 9:1 by weight.

To achieve proper ultraviolet light protection an ultraviolet light resistant material may be blended with the above recited formulations. Preferred ultraviolet light resistant materials are carbon black formulations such as blends of carbon black with low density polyethylene (LDPE). Preferred blends range from about 1.0 to about 10.0 weight per cent carbon black preferably 2.0 to about 3.0. Alternatively, hindered amines may be used as the ultraviolet light resistant materials. Use of hindered amines allows for the regulation of color to the coating. Preferred hindered amines are compounds of the formula bis(2,2.6.6-tetramethyl-4-piperidyl)sebacates. The most preferred bis(2,2,6,6-tetramethyl-4-piperidyl)sebacate is commercially available under the name Tinuvin T-770.

The amount of Tinuvin T-770 ranges from about 0.1 to about 1.0 weight per cent.

In a preferred embodiment of the invention, stabilizing agents are blended with the above referenced formulations. Preferred stabilizing agents are compounds such as tetrakis [methylene(3,5-di-tert-butyl-4-hydroxyhydrocinnamate)] methane or bis(2,4-di-tert-butylphenyl) pentaerythritol diphosphite. The most preferred tetrakis [methylene(3,5-di-tert-butyl-4-hydroxyhydrocinnamate)] methane compound is commercially available under the name Irganox 1010. The most preferred bis(2,4-di-tert-butylphenyl) pentaerythritol diphosphite is commercially available under the name Ultranox 626.

The amount of Irganox 1010 to be added ranges from about 200 to about 1500, and is preferably about 900 ppm. The amount of Ultranox 626 added ranges from about 200 to about 1000, preferably about 600 ppm.

Preparation of Coating Formulations

The coating components as recited above were tumble blended to form a homogenous physical mixture.

The homogenous mixture was extruded at melt temperatures ranging from 193° C. to 215° C. in order to homogenize, blend and pelletize the materials. The temperature range over which the homogenous mixture could be extruded is 180° C. to 240° C. The materials were extruded using a 24:1 Reifenhauser Extruder single screw extruder, although any extruder capable of processing the mixture could be used. The extruder used had a barrier screw with a Maddox mixer section and a 5 hole die. Extrusions may be conducted under an inert gas atmosphere; the extrusions mentioned here were conducted under nitrogen.

Preparation of Coated Weatherstripping

The coatings of the invention were coextruded with rubbery polymers, for example, EPDM. The extrusion was done at 190° C. on a 24:1 single screw extruder; however, the type of extruder is not critical and the temperature used need only be sufficient to melt the polymer yet less than the temperature at which significant thermal degradation of the polymer occurs. The HDPE blends were extruded at 215° C. on a 24:1 single screw extruder. After coextrusion the coated weatherstripping material was vulcanized for 2 min. at 205° C. and then water cooled. A line speed of approximately 7 ft/min was maintained throughout the extrusion process.

Table 1 depicts various formulations, for polyethylene based polymers, which were tested.

TABLE 1

Polyethylene Based Coating Composition

| Sample | COMPONENTS* | | | ADDITIVES** | | |
|---|---|---|---|---|---|---|
| | HDPE % | BMHDPE % | ELASTOMER % | CB % | Talc I % | Talc II % |
| 1 | 90 | — | 10 | 5 | — | — |
| 2 | 60 | 40 | — | 5 | — | — |
| 3 | 54 | 36 | 10 | 5 | — | — |
| 4 | 54 | 36 | 10 | 5 | 4 | 6 |

All samples contained 900 ppm Irganox 1010 and 600 ppm Ultranox 626 as stabilizing agents.
HDPE - MI (Melt Index at 190° C.) = 7 dg/min; 0.952 Density
BMHDPE - bimodal HDPE MI = 0.07 dg/min 0.952 Density 1:1 blend of high molecular weight to low molecular weight
Elastomer - 67/33% blend of Vistalon 503 brand ethylene/propylene rubber (more fully described in U. S. Pat. No. 4,895,897) and HDPE
*Components are based on weight % of polymeric ingredients.
**Additives are weight % based on total polymeric ingredients.
CB - 1:1 blend of carbon black and LDPE
Talc I - Pfizer MP 12-50.
Talc II - Pfizer Microtuf 1000.

Table 2 depicts test results for abrasion resistance as well as coefficient of friction measurements. The test formulations were coextruded onto a thermoplastic elastomer, in the form of automobile window channels and then were tested as indicated. The Honda and Toyota abrasion tests are very similar and involve cycling a piece of weighted glass back and forth at 1 cycle/second in the window channel. In the Honda test, the glass is weighted with a 1.5 kg weight while a 3 kg weight is used in the Toyota test. Satisfactory performance is achieved in each test if the coating withstands 10,000 cycles without cracking or wearing through to the underlying weatherstripping substrate material. The coating should have coefficient of friction (COF) close to that of flocking that is to say close to 0.26.

As can be seen all samples passed the Honda test. Under the more rigorous Toyota test only sample 3, a blend of 36 weight per cent bimodal MWD polyethylene polymer with 54 weight per cent medium molecular weight HDPE, passed the test. This sample exhibited only 10 per cent wear after 10,000 Toyota cycles, and still did not exhibit failure after 20,000 Toyota cycles. All samples exhibited COF values in the desired range.

TABLE 2

Polyethylene Based Coating Compositions Performance

| Sample | Honda Cycles[1] | Toyota Cycles[2] | COF to Glass |
|---|---|---|---|
| 1 | 10,000 | 500 | 0.18–0.25 |
| 2 | 10,000 | 1,500 | 0.18–0.24 |
| 3 | 10,000 | 20,000 | 0.22–0.23 |
| 4 | 10,000 | 1,200 | 0.19–0.26 |

[1]1.5 kg weight
[2]3.0 kg weight
COF to Glass measurements made in accordance with ASTM D 1894.

Table 3 depicts Shore D hardness, flexural modulus and melt index values for the polyethylene based formulations. Since all samples are HDPE based, the flexural moduli fall in a relatively narrow range. No correlation is apparent between abrasion resistance results and the flexural values.

The talc filled sample exhibited a higher degree of stiffness and higher moduli than the corresponding talc-free sample.

TABLE 3

Polyethylene Based Coating compositions - Properties

| Sample | Shore D Hardness | Flexural Modulus | | | 190° C. Melt Index (dg/min) | | |
|---|---|---|---|---|---|---|---|
| | | 1% Secant (psi) | 2% Secant (psi) | Tangent (psi) | 2 kg | 5 kg | 21 kg |
| 1 | 58.3 | 113,930 | 94,578 | 126,378 | 5.3 | 15.37 | 144.5 |
| 2 | 59.5 | 127,885 | 110,484 | 145,225 | 0.95 | 3.96 | 66.75 |
| 3 | 56.2 | 111,797 | 92,078 | 129,853 | 0.85 | 3.55 | 56.98 |
| 4 | 57.4 | 136,371 | 111,912 | 156,275 | 1.15 | 4.57 | 68.31 |

Shore D Hardness measurements made in accordance with ASTM D 2240.
Flexural Modulus measurements made in accordance with ASTM D 790-86.
Melt Indices measurements made in accordance with ASTM D 1238-86.

As can be seen from the results in Table 2, Sample 3 showed dramatic improvement in the Toyota test. The polymeric ingredients of Sample 3 consisted of about 54 wt. % of medium molecular weight HDPE, 18 wt. % of high molecular weight HDPE, 18 wt. % of low molecular weight HDPe, and 10 wt. % elastomer. When considering only the HDPE component the percentages are about 60 wt. % medium molecular weight component, about 20 wt. % high molecular weight component and about 20 wt. % low molecular weight component.

These coating compositions can be adhered as a layer onto a layer of rubbery polymers by known methods such as co-extrusion or lamination to form excellent weatherstripping materials.

We claim:

1. A low friction, abrasion resistant polymer coating composition comprising:
    (a) a high density polyethylene component comprising a blend of
        (i) high molecular weight, high density polyethylene;
        (ii) low molecular weight, high density polyethylene; and
        (iii) medium molecular weight, high density polyethylene; and
    (b) an elastomer component comprising a blend of ethylene/propylene rubber and high density polyethylene.

2. The polymer coating composition defined in claim 1 wherein said high molecular weight, high density polyethylene has a molecular weight of between 100,000 and 9,000,000.

3. The polymer coating composition defined in claim 1 wherein said low molecular weight, high density polyethylene has a molecular weight of between 1,000 to 50,000.

4. The polymer coating composition defined in claim 1 wherein said medium molecular weight, high density polyethylene has a molecular weight of between 50,000 and 100,000.

5. The polymer coating composition defined in claim 1 wherein the ratio of said high molecular weight high density polyethylene to low molecular weight high density polyethylene is 1:1.

6. The polymer coating composition defined in claim 1 wherein said high molecular weight, high density polyethylene comprises from about 10 to 80 percent by weight of said high density polyethylene; 20 to 70 percent by weight medium molecular weight, high density polyethylene and the balance low molecular weight, high density polyethylene.

7. The polymer coating composition defined in claim 1 or 5 wherein said elastomer comprises from about 50 to 99 weight percent ethylene/propylene rubber and 50 to 1 percent by weight high density polyethylene.

8. The polymer coating composition defined in claim 1 wherein the ratio of said high density polyethylene component to said elastomer component ranges from about 3:1 to about 19:1.

9. The polymer coating composition defined in claim 1 further comprising an ultraviolet resistant material.

10. The polymer coating composition defined in claim 9 wherein said ultraviolet resistant material is selected from the group comprising hindered amines and blends of carbon black with low density polyethylene.

11. The polymer coating composition defined in claim 1 further comprising a stabilizing agent.

12. The polymer coating composition defined in claim 11 wherein said stabilizer is selected from the group comprising tetrakis methane and bis(2,4-di-tert-butylphenyl) pentaerythritol disphosphite, and mixtures thereof.

13. A low friction, abrasion resistant polymer coating composition comprising:
    (a) a high density polyethylene blend comprising:
        (i) a 10 to 80 percent by weight of high molecular weight high density polyethylene;
        (ii) 0 to 80 percent by weight of medium molecular weight high density polyethylene;
        (iii) 10 to 80 percent by weight of low molecular weight high density polyethylene and;
    (b) an elastomer component comprising a blend of 99 to 50 weight percent ethylene/propylene rubber and 1 to 50 weight percent high density polyethylene; wherein the ratio of said high density polyethylene component to said elastomer component ranges from 3:1 to 19:1.

14. The polymer coating composition defined in claim 13 wherein the molecular weight of said high molecular weight polyethylene ranges from about 100,000 to 4,000,000.

15. The polymer coating composition defined in claim 13 wherein the molecular weight of said medium molecular weight high density polyethylene ranges from about 50,000 to about 100,000.

16. The polymer coating composition defined in claim 13 wherein the molecular weight of said low molecular weight high density polyethylene ranges from about 1,000 to about 50,000.

17. The polymer coating composition defined in claim 13 wherein the ration of said high molecular weight high density polyethylene to said low molecular weight high density polyethylene is about 1:1.

18. The polymer coating composition defined in claim 13 further comprising ultraviolet resistant material.

19. The polymer coating composition defined in claim 52 wherein said ultraviolet resistant material is present in an amount ranging from about 1.0 to 10.0 weight percent.

20. The polymer coating composition defined in claim 17 or 19 wherein said ultraviolet resistant material is selected from the group comprising hindered amines and blends of carbon black and low density polyethylene.

21. The polymer coating composition defined in claim 13 further comprising a stabilizing agent.

22. The polymer coating composition defined in claim 21 wherein said stabilizing agent is present in an amount ranging from 200 to 1000 ppm.

23. The polymer coating composition defined in claim 21 wherein said stabilizing agent is selected from the group comprising tetrakis methane and bis(2,4-di-tert-butyl phenyl) pentaerythritol diphosphite.

24. The polymer coating composition defined in claim 13 wherein said EPR comprises 67 weight percent of said elastomer component.

25. The polymer coating composition defined in claim 13 wherein the ratio of said high density polyethylene component to said elastomer component is 3:1.

26. A coated weather stripping material comprising:
 (a) a first layer comprising a rubbery polymer and
 (b) a second layer comprising a polymer coating composition, said polymer coating composition comprising:
  (i) a high density polyethylene component comprising
   (A) 20 to 80 weight percent high molecular weight high density polyethylene;
   (B) 0 to 80 weight percent medium molecular weight high density polyethylene;
   (C) 20 to 80 weight percent low molecular weight high density polyethylene; and
  (ii) an elastomer component comprising a blend of 99 to 50 weight percent ethylene/propylene rubber and 1 to 50 weight percent high density polyethylene; the ratio of said high density polyethylene component to said elastomer component ranging from 3:1 to 19:1.

27. The coated weatherstripping defined in claim 26 wherein said elastomer component comprises 67 weight percent ethylene/propylene rubber and 33 weight percent high density polyethylene.

28. The coated weather stripping material defined in claim 26 wherein the ratio of said high molecular weight high density polyethylene to said low molecular weight high density polyethylene is 1:1.

29. The coated weatherstripping defined in claim 26 wherein said polymer coating composition further comprises 1.0 to 10.0 weight percent of an ultraviolet resistant material.

30. The coated weatherstripping defined in claim 29 wherein said ultraviolet resistant material is selected from the group comprising hindered amines and blends of carbon black and low density polyethylene.

31. The coated weatherstripping defined in claim 26 wherein said polymer coating composition further comprises 200 to 1000 ppm of a stabilizing agent.

32. The coated weatherstripping defined in claim 31 wherein said stabilizing agent is selected from the group comprising tetrakis methane and bis(2,4-di-tert-butylphenyl) pentaerythritol diphosphite.

33. The coated weatherstripping of claim 26 wherein said high density polyethylene component comprising 20 weight percent high molecular weight high density polyethylene having a molecular weight of between 100,000 and 4,000,000; 60 weight percent medium molecular weight high density polyethylene having a molecular weight of between 50,000 to 100,000 and 20 weight percent low molecular weight high density polyethylene having a molecular weight of between 1,000 and 50,000 and said elastomer component comprising 67 weight percent ethylene/propylene rubber and 33 weight percent high density polyethylene, the ratio of said high density polyethylene component to said elastomer component being 9:1 and further comprising 5 weight percent of a 1:1 blend of carbon black and low density polyethylene.

* * * * *